United States Patent Office 3,365,405
Patented Jan. 23, 1968

3,365,405
METHOD FOR POLYMERIZING OLEFIN OXIDES USING A HEAT-TREATED METAL PHOSPHATE CATALYST
Kenichi Fukui, Sachio Yuasa, Tsutomu Kagiya, and Takeo Shimizu, Kyoto, and Takezo Sano, Ibaraki-shi, Japan, assignors to Sumitomo Chemical Company, Ltd., Osaka, Japan
No Drawing. Continuation-in-part of application Ser. No. 168,249, Jan. 23, 1962. This application Apr. 25, 1966, Ser. No. 544,831
Claims priority, application Japan, Jan. 28, 1961, 36/2,723
4 Claims. (Cl. 260—2)

ABSTRACT OF THE DISCLOSURE

A method for polymerizing ethylene oxide or propylene oxide to a polymer having molecular weight of about 2,000 to 1,000,000 at a temperature from 0° to 170° C. for a period of time ranging from 0.5 hour to 2 months, using a catalyst constituted of a phosphate of titanium, zirconium, vanadium, chromium, manganese or iron, which is previously heat-treated at a temperature from about 300° C. to 1,500 °C. for a period from 1 to 10 hours. Some of the products having higher molecular weight are crystalline, and give stretchable films.

This application is a continuation-in-part of our co-pending application, Serial No. 168,249, filed Jan. 23, 1962, now abandoned.

This invention relates to a novel and improved polymerization method of olefin oxide and is particularly concerned with the use of an improved catalyst for preparing olefin oxide polymers. In a particular aspect, the invention is concerned with the preparation of polymers of ethylene oxide and propylene oxide having a moderately high molecular weight.

Concerning the catalysts to be employed for the polymerization of olefin oxides, Friedel-Crafts type compounds, such as boron trifluoride, tin tetrachloride, and zinc chloride, as well as acids, alkalis, and alkaline earth metal carbonates, have heretofore been known. Recently, metal halides, such as ferric chloride, metal alkoxide, and metalalkyl compounds, have been reported.

Among these catalysts, those which are known to be able to yield olefin oxide polymers of excellent properties and are now being employed commercially, have various disadvantages in, among others, that they are difficulty handled, and that they need a higher purity in the monomer and other reactants.

It is an object of this invention to provide a novel and improved method for polymerizing olefin oxides. It is another object to provide such method by use of a catalyst which is easily prepared and handled, and need not so complete a purification of the monomer and other reactants, when compared with the conventional ones. It is still another object to provide a method for the polymerization of olefin oxides, which is adaptable to a continuous process. It is a still further object to provide such a method wherein the physical properties of the polymer product can be controlled within a broad range by selection of the conditions for the preparations of the present catalysts.

The above objects are attained by means of this invention, wherein olefin oxides, either singly or in admixture, are readily polymerized to moderately high molecular weight polymers by effecting the polymeriaztion in the presence of a heat-treated phosphate of a metal selected from the group consisting of titanium, zirconium, vanadium, chromium, manganese and iron. The significantly improved yields of the moderately high molecular weight polymers produced with the catalyst were unexpected.

The catalyst to be employed in the present invention may be chosen from the various known ones, of which the chemical composition, the physical properties, and the crystalline structure, have been well studied. In other words, the metal phosphate employed in the present invention may be any salts of oxyacids of phosphorus of the above-mentioned metal, such as the metal salts of ortho-, pyro-, meta-, hypo- and polyphosphoric acids.

Typical examples of the salts of oxyacids of phosphorus include orthophosphates, such as $M_{3/m}PO_4$, $M_{2/m}HPO_4$, and $M_{1/m}H_2PO_4$; pyrophosphates, such as $M_{4/m}P_2O_7$ and $M_{2/m}H_2P_2O_7$; metaphosphates, such as $(M_{1/m}PO_3)_n$; hypophosphates, such as $M_{4/m}P_2O_6$; tripolyphosphates, such as $M_{5/m}P_3O_{10}$; polyphosphates, and the like, wherein M is a metal atom or a metal oxide group, wherein the metal is selected from the group consisting of titanium, zirconium, vanadium, chromium, manganese and iron, $m$ is a valency of M and $n$ is a whole number not lower than 2. Examples of the metal oxide groups include vanadyl (VO), chromyl (CrC_2), titanyl (TiO), zirconyl (ZrO) and other oxygen containing metal radicals.

Some of the above phosphates are commercially available, for example, chromic phosphate ($CrPO_4$), manganese phosphate ($MnHPO_4$), manganese pyrophosphate ($Mn_2P_2O_7$), ferrous phosphate ($Fe_3(PO_4)_2$), ferric phosphate ($FePO_4$), etc. and the other phosphates may be prepared by reaction of a phosphoric acid or a phosphate with a compound of said metal such as halide, oxyhalide, oxide, nitrate, sulfate and others. They may be employed, even if their chemical composition or crystalline structure is not obviously known.

For instance, a compound formed, as precipitate, by the reaction of a metal halide or a metal oxyhalide with a water-soluble phosphate in an aqueous medium is separated, washed well with water, dried, heat-treated, and employed for the method of the present invention. Typical examples of such compounds include phosphate of titanium (composition and structure being not obvious), zirconium pyrophosphate ($ZrP_2O_7$), and others. A compound formed by the reaction of a metal oxide with phosphoric acid may also be employed, typical examples being vanadyl orthophosphate ($VO \cdot PO_4$), zirconyl pyrophosphate (($ZrO)_2P_2O_7$), chromium metaphosphate ($Cr(PO_3)_3$), and others. Examples of the compounds formed by the reaction of a metal nitrate or sulfate with phosphoric acid or a phosphate include manganese pyrophosphate ($Mn_2P_2O_7$), chromium phosphate ($CrPO_4$) and others.

The metal phosphate catalyst employed in this invention should be previously heat-treated at a temperature of 300° to 1500° C. for a sufficient time to have the desired activity. The period of time of heat treatment is preferably in the range between 1 and 10 hrs. The temperature, at which the catalyst is heat-treated, seems to have a relation with the degree of polymerization of the polymeric product. For instance, a higher heat-treating temperature yields a higher degree of polymerization of product when ethylene oxide is polymerized by use of a phosphate of zirconium. By suitable choice of the heat-treating temperature and other conditions, olefin oxide polymers produced have various properties, such as greasy, waxy, or resinous.

When the temperature of heat-treatment is below 300° C., the molecular weight of the product is too low to use practically, while when above 1500° C., the polymer-producing activity of the catalyst is too low to be applied in industry. Accordingly the heat-treatment is preferably effected at the temperature between 300° and 1500° C. This is a significant advantageous feature of the present invention, as compared with a conventional catalyst, e.g. strontium carbonate wherein the temperature range allowed for calcination is very narrow, and the control of the properties of the product by the catalyst is rather difficult.

If required, the catalyst used in this invention may be prepared on a carrier or support, such as silica, alumina, silica-alumina, and various kinds of clay.

The catalysts used in this invention have a comparatively longer life of activity, since they are of the type which catalyzes the polymerization reaction by orienting adsorption of monomer on the solid surface. Moreover, the catalysts can be regenerated and reused merely by separation from the product, and heat-treatment if required. These are also advantageous features of the present invention.

The composition of the catalyst used in this invention may vary according to the kind and type of the phosphate and to the conditions of the preparation, such as proportions of the amounts of the reactant used. Besides, the crystallinity and crytal form of the catalyst may vary according to the condition of the heat-treatment. Consequently, the polymerization rate, as well as the properties of the polymeric product, varies depending upon the nature of the catalyst used.

Olefin oxides polymerized according to the present invention include ethylene oxide and propylene oxide. Among those, ethylene oxide is particularly recommended to give beneficial result.

The polymerization of the present invention may be carried out according to a bulk polymerization process advantageously without solvent. However, it may sometimes be carried out according to a solution, suspension, or dispersion polymerization process. In the latter processes, any solvent or liquid medium may be employed provided that it is inert to the reaction. Examples of such solvents or liquid media include liquid hydrocarbons and halo-hydrocarbons, ethers, ketones, esters, and the like. Selections of the kind and amount of the solvent or liquid media serve for variation of the properties of the polymeric product.

The contact of an olefin oxide with the catalyst may be conducted either in a batch system, in a semi-batch system, or in a continuous system. In the latter instance, the catalyst may be in fixed bed, or fluidized bed. The reaction conditions may be chosen within a broad range. The polymerization temperature may be chosen within the range of 0° to 170° C., preferably within the range of 20° to 100° C. Since lower olefin oxides have lower boiling points, their polymerization is preferably conducted in a pressure vessel.

The polymerization reaction period of time may be chosen within the range of 0.5 hour to 2 months, preferably within the range of 1 hour to 1 month.

The amount of the catalyst to be employed may be chosen within the range of 0.1 to 100 parts by weight per 100 parts by weight of monomer, preferably within the range of 1 to 20 parts by weight per 100 parts by weight of monomer.

The reaction product can be recovered by a suitable process from the mixture. For example, the product is dissolved in or diluted with a suitable solvent (such as chloroform) and the solid catalyst is removed from the solution of the product by centrifuge or by filtration. The solution is poured into a non-solvent for the olefin oxide polymer and the resulting precipitate is recovered.

The molecular weight of the olefin oxide polymer produced by the method of the present invention is in a wide range. It is measured by various known methods. Conveniently, it is calculated from the intrinsic viscosity by using the relation formula established between intrinsic viscosity and molecular weight. For instance, the following formula proposed by Bailey and Callard can be used:

$$[\eta] = 6.4 \times 10^{-5} M^{0.82}$$

(Reference: J. Appl. Polymer Sci., 1, 56 (1959))

Thus, the olefin oxide polymer produced according to this invention is found to have a molecular weight between 2,000 and 1,000,000. Depending upon the molecular weight, the properties and appearance are varied remarkably. Some of the products having higher molecular weight are crystalline, and give stretchable films.

The present invention will be described in more detail with respect to the following examples, which are, however, merely by way of illustration and not by way of limitation.

*Example 1*

A solution of titanium tetrachloride dissolved in a dilute hydrochloric acid was mixed with an equimolar amount of aqueous phosphoric acid solution, and the resulting precipitate was, after being allowed to stand overnight, filtered and well washed with water, followed by drying at 100° C. for 3 days and was heat-treated at 500° C. for 5 hours in the presence of air in an electric furnace.

Into a 100-cc. inner volume stainless steel autoclave equipped with an electromagnetically driven, up-and-down moving agitator, 0.67 gram of the catalyst prepared as mentioned above was placed, and the air in the autoclave was replaced by nitrogen gas. Cooling the autoclave, 15 grams of purified ethylene oxide was charged under nitrogen blanket. The reaction was allowed to proceed by heating to 80° C. while being stirred for 3 hours, after which period the autoclave was cooled and the content was taken out and dried at a subatmospheric pressure. The product was dissolved into chloroform, centrifuged to separate it from the catalyst, and poured into ethyl ether, thereby polymeric product being precipitated. The product separated was soft waxy, weighing 2.3 grams.

Also, 48 grams of ethylene oxide was polymerized by use of 0.1 gram of the same catalyst in a sealed glass tube at room temperature for one month. Similarly, 1.0 gram of waxy polymer was obtained.

*Example 2*

Commercially available ferrous phosphate was heat-treated at 500° C. for 5 hours. Using 0.1 gram of the heat-treated catalyst, 6.0 grams of ethylene oxide was treated in a sealed glass tube at room temperature for one month. A hard waxy polymer, 1.1 grams, was obtained.

*Example 3*

Precipitates formed by reaction of an aqueous zirconium oxychloride solution with an aqueous diammonium hydrogen-phosphate [$(NH_4)_2HPO_4$] solution were dried at 100° C. for 3 days. The product was heated at various temperatures for 5 hours, namely at 300°, 500°, 700°, 900° and 1,000° C. Using each time 1.17 grams of the catalyst, ethylene oxide was treated in an autoclave at 80° C. for 3 hours in a similar way to the above-mentioned.

The results are set forth below.

| Heat-treatment temp., °C. | Monomer charge (g.) | Yield (g.) | Product appearance | Intrinsic viscosity ([η]) | Softening point (°C.) |
|---|---|---|---|---|---|
| Untreated | 15.5 | 12.6 | Soft wax | 0.15 | |
| 300 | 16 | 10.3 | Hard wax | 0.49 | 57-58 |
| 500 | 14 | 6.0 | do | 0.49 | 56-58 |
| 700 | 14 | 3.6 | do | 0.56 | 57-59 |
| 900 | 22 | 2.4 | Resinous | 0.96 | 60-62 |
| 1,000 | 26 | 2.1 | do | 0.88 | 59-60 |

The intrinsic viscosity, [η], in this and subsequent examples, was determined in water at 35° C. by use of Ubbelohde viscometer.

*Example 4*

The phosphate of zirconium prepared as in Example 3 was heated at 500° C. for 5 hours. Using 0.1 gram of the heat-treated catalyst, 4.5 grams of ethylene oxide was treated in a sealed glass tube at room temperature. Seven days later, about 0.8 gram of substantially pure polymer was obtained, a part of which was resinous and film-formable. Its infrared analysis showed that it was a polyether having high crystallinity.

*Example 5*

Commercially available vanadium pentoxide was mixed with orthophosphoric acid and the mixture was allowed to stand for 5 days with occasional stirring.

The precipitated product was washed with methanol to remove the excess of phosphoric acid and dried, followed by heat-treatment in air at 500° C. for 5 hours.

Using 1.42 grams of the heat-treated catalyst, 15 grams of ethylene oxide was treated at 70° C. for 8 hours. A greasy polymer, 1.0 gram, was obtained.

*Example 6*

The phosphate of zirconium prepared as in Example 3 was heated at 900° C. for 5 hours. Using 1.17 grams of the catalyst, several runs of polymerization of ethylene oxide were carried out at 100° C., varying the reaction time. The polymerizations were conducted in a 100-cc. autoclave equipped with an electromagnetically driven stirrer. The amount of the monomer in each run was 15 grams. The results are shown in the following table:

| Polymerization time (hours) | Yield of polymer (g.) | Intrinsic viscosity ([η]) |
|---|---|---|
| 1 | 1.3 | 1.34 |
| 3 | 2.7 | 1.16 |
| 6 | 3.6 | 1.21 |
| 12 | 4.9 | 1.15 |
| 24 | 6.9 | 0.96 |

*Example 7*

Using various catalysts prepared as in the examples mentioned above, the runs of polymerization of ethylene oxide were carried out in glass tubes at 100° C. The amount of each catalyst was 0.1 gram, and the amount of the monomer fed was 1 gram. The polymerizations were conducted in a water bath kept at the constant temperature under rotary agitation. In each case, the polymerization time was 6 hours. The results were as follows:

| Catalyst | Heat-treatment temp. (°C.) | Yield of polymer (g.) | Intrinsic viscosity ([η]) |
|---|---|---|---|
| Phosphate of Ti | 500 | 0.43 | 0.44 |
| Phosphate of Fe | 500 | 0.16 | 0.18 |
| Phosphate of Zr | 500 | 0.41 | 0.56 |
| Do | 900 | 0.54 | 0.10 |

*Example 8*

A solution of chrome alum [$CrK(SO_4)_2 \cdot 12H_2O$] in water and a solution of diammonium hydrogenphosphate (the amount being equivalent to that of chrome alum) in water were mixed together under heating. The precipitate was separated, washed with water, and dried to yield chromic phosphate. The phosphate was heated at 500° C. for 5 hours before use. Using 0.75 gram of the heat-treated catalyst, 14 grams of ethylene oxide was polymerized in a 100-cc. autoclave at the reaction temperature of 80° C. for 6 hours. The treatment of the reaction mixture as in the preceding examples gave 1.2 grams of a soft waxy polymer.

*Example 9*

A solution of manganic nitrate in nitric acid was added hot to dilute phosphoric acid. After standing for several hours under heating, the resulting precipitates were separated, washed with water, and dried to yield manganic phosphate, which was then heated in a hydrogen stream at 500° C. for 5 hours to be converted to the manganous type phosphate. Using 0.25 gram of the calcined catalyst, 15 grams of ethylene oxide was treated in a 100-cc. autoclave at the reaction temperature of 80° C. for 7 hours. The treatment of the reaction mixture as in the preceding examples gave 1.3 grams of a soft waxy polymer.

*Example 10*

A phosphate of zirconium prepared as in Example 3 was heated at 500° C. for 5 hours. In a 100-cc. autoclave, 15 grams of propylene oxide and 1.0 gram of the heat-treated catalyst were fed and made to react at the reaction temperature of 100° C. for 6 hours. Thereafter, the catalyst was separated by centrifugation from the reaction mixture, and the monomer was recovered by evaporation. A viscous oily polymer, weighing 3.7 grams, was obtained.

*Example 11*

A phosphate of zirconium prepared as in Example 3 was heated at 1000° C. for 5 hours. Polymerizations were carried out in an autoclave, using each 1.0 gram of the heat-treated catalyst, an amount of ethylene oxide, and 50 cc. of a solvent at a reaction temperature of 80° C. for 3 hours. The results were as follows.

| Solvent | Amount of monomer (g.) | Yield of polymer (g.) | Appearance |
|---|---|---|---|
| None | 26 | 3.3 | Solid. |
| Heptane | 21 | 3.2 | Do. |
| Benzene | 17 | 2.3 | Waxy. |
| Methylene chloride | 21 | 2.2 | Do. |

In the cases of using solvent, the catalyst was easily separated from the reaction mixture after the reaction by merely being subjected to centrifugation or filtration.

What is claimed is:

1. A method for the production of olefin oxide polymers having molecular weights of about 2,000 to 1,000,000, which comprises polymerizing an olefin oxide selected from the group consisting of ethylene oxide and propylene oxide in the presence of a catalyst essentially constituted of a phosphate of a metal selected from the group consisting of titanium, zirconium, vanadium, chromium, manganese and iron, said catalyst having been previously heat-treated at a temperature of from about 300° C. to 1,500° C. for a period of from 1 to 10 hours, the polymerizing step being operated for a period of time ranging from 0.5 hour to 2 months, at a temperature of from 0° to 170° C.

2. A method according to claim 1, wherein said metal is titanium.

3. A method according to claim 1, wherein said metal is zirconium.

4. A method according to claim 1, wherein said metal is vanadium.

References Cited
UNITED STATES PATENTS 2,569,092 9/1951 Deering _____ 252—437
3,058,921 10/1962 Pannell _____ 260—2

FOREIGN PATENTS 594,025 3/1960 Canada.

OTHER REFERENCES

Lee et al.: "Epoxy Resins," McGraw Hill (1957), pages 30–34 (TP 986E6L4), copy in Scientific Library.

WILLIAM H. SHORT, *Primary Examiner.*

T. PERTILLA, *Assistant Examiner.*